US009255991B2

(12) United States Patent
Kalbhenn et al.

(10) Patent No.: US 9,255,991 B2
(45) Date of Patent: Feb. 9, 2016

(54) METHOD AND DEVICE FOR ACOUSTICALLY SENSING AN AREA

(75) Inventors: Micha Kalbhenn, Ludwigsburg (DE); Albrecht Klotz, Leonberg (DE); Juergen Schirmer, Heidelberg (DE); Thomas Treptow, Leonberg (DE); Dirk Schmid, Simmozheim (DE); Nico Bannow, Stuttgart (DE); Peter Rapps, Karlsruhe (DE); Tobias Kirchner, Ludwigsburg (DE); Thomas Dittrich, Neuhausen (DE); Michael Schumann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 361 days.

(21) Appl. No.: 13/994,316

(22) PCT Filed: Dec. 2, 2011

(86) PCT No.: PCT/EP2011/071623
§ 371 (c)(1),
(2), (4) Date: Aug. 16, 2013

(87) PCT Pub. No.: WO2012/080004
PCT Pub. Date: Jun. 21, 2012

(65) Prior Publication Data
US 2013/0312525 A1 Nov. 28, 2013

(30) Foreign Application Priority Data
Dec. 14, 2010 (DE) .......................... 10 2010 062 983

(51) Int. Cl.
*G01S 15/93* (2006.01)
*G01S 7/527* (2006.01)

(52) U.S. Cl.
CPC .............. *G01S 15/931* (2013.01); *G01S 7/527* (2013.01); *G01S 2015/935* (2013.01)

(58) Field of Classification Search
CPC .. G01S 7/527; G01S 15/931; G01S 2015/935
See application file for complete search history.

(56) References Cited

U.S. PATENT DOCUMENTS

| 5,335,545 | A | 8/1994 | Leszczynski | |
|---|---|---|---|---|
| 5,889,490 | A * | 3/1999 | Wachter | G01S 17/36 367/100 |
| 6,490,226 | B2 * | 12/2002 | Iwasaki | G01S 15/931 367/97 |
| 8,699,299 | B2 * | 4/2014 | Horsky | B06B 1/0253 367/95 |
| 2001/0012238 | A1 | 8/2001 | Iwasaki et al. | |
| 2006/0133210 | A1 | 6/2006 | Ishihara et al. | |
| 2011/0261652 | A1 * | 10/2011 | Horsky | B06B 1/0253 367/97 |
| 2013/0312525 | A1 * | 11/2013 | Kalbhenn | G01S 7/527 73/597 |

FOREIGN PATENT DOCUMENTS

| DE | 101 03 936 | 1/2002 |
|---|---|---|
| DE | 102004020426 | 11/2005 |
| JP | 9-14836 | 1/1997 |
| JP | 10268035 | 10/1998 |

* cited by examiner

*Primary Examiner* — Daniel Pihulic
(74) *Attorney, Agent, or Firm* — Kenyon & Kenyon LLP

(57) ABSTRACT

A method for acoustically sensing an area is described. An acoustic transmit pulse is transmitted into the area by an acoustic transducer and a received signal is acquired with the aid of the transducer, in order to receive the transmit pulse reflected back from the area. Within a post-pulse oscillation time of the transducer, which directly follows the emission of the transmit pulse, the actual phase response of the received signal is determined. In the event the actual phase response deviates from a predefined setpoint phase response, an object is detected within the area. Also described is a device for acoustically sensing an area, which is designed to carry out the method.

11 Claims, 2 Drawing Sheets

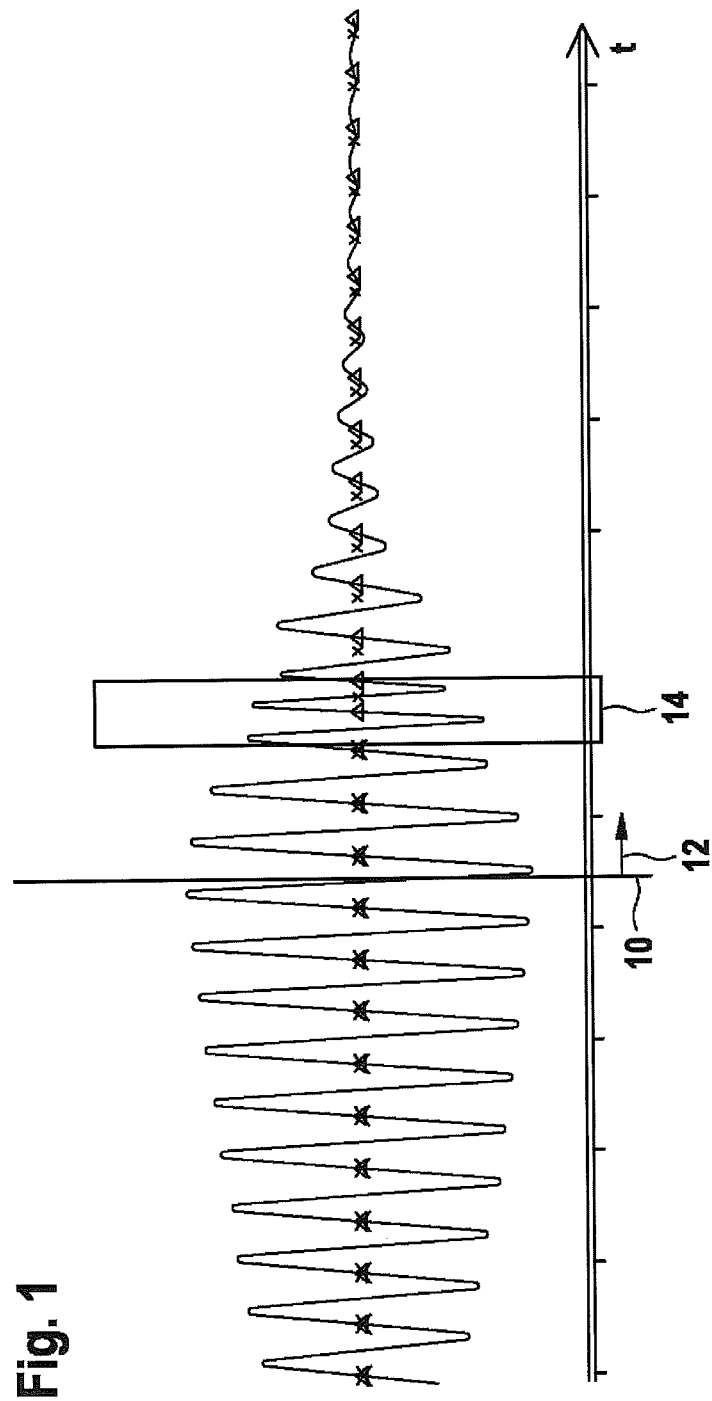

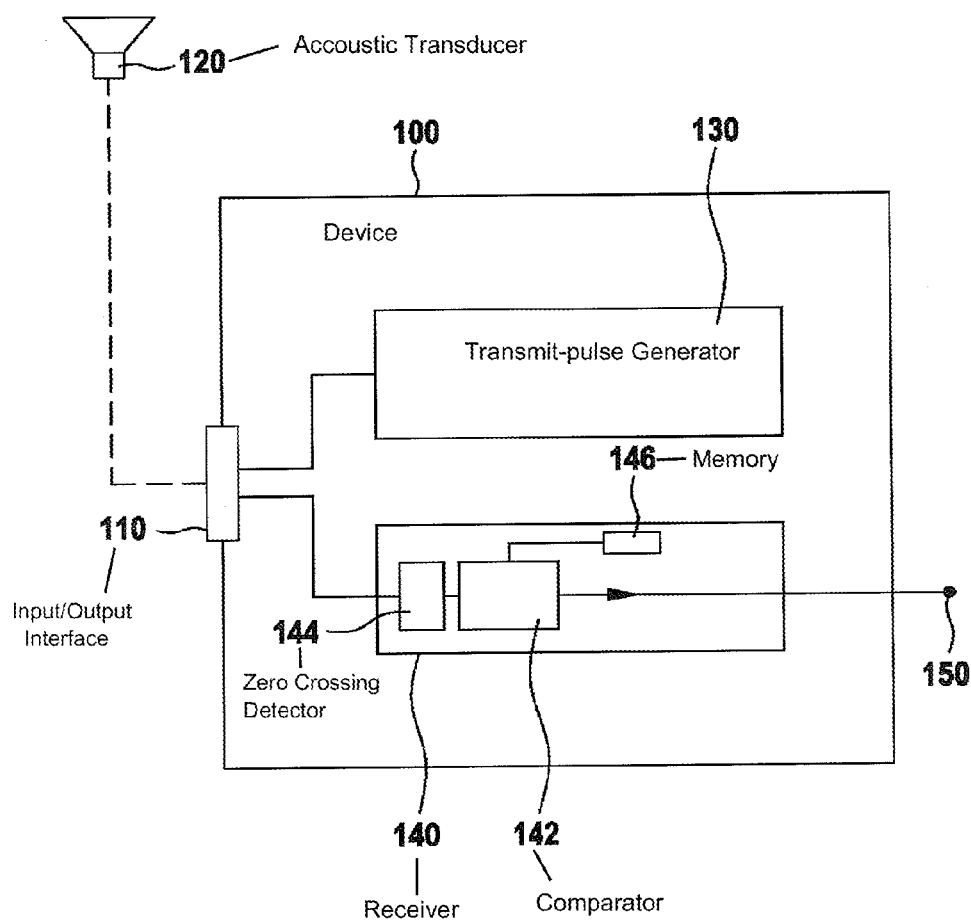

METHOD AND DEVICE FOR ACOUSTICALLY SENSING AN AREA

BACKGROUND INFORMATION

It is particularly well-known from the automotive sector to use pulse-echo methods to sense the driving environment. For example, in the case of parking-assistance systems, ultrasonic transducers are used which emit a scanning pulse and receive it again. The distance between the transducer and the reflecting object is obtained from the echo time.

The mass and the springiness of an acoustic transducer first of all define a self-resonant frequency of the transducer, and secondly, form mechanical energy stores. An oscillatory system results which oscillates post-pulse even after the excitation has ended. The receiving cycle begins after this post-pulse oscillation process has ended. Thus, the post-pulse oscillation defines a dead time during which no receiving is carried out, that is honored when switching over from the transmit mode to the receive mode of the transducer.

For example, German Published Patent Appln. No. 10 2004 020426 mentions the dead time, which results owing to the post-pulse oscillation, as a problem which limits a minimal measuring distance downwards. The citation mentions a distance of 20 cm as minimal measuring distance or measuring limit. In this context, the publication points out that echo signals of shorter distance merge with the post-pulse oscillation and can no longer be detected.

To be sure, it is known to reduce the post-pulse oscillation by additional mechanical damping. However, the overall sensitivity of the transducer is thereby decreased, which is why this measure can only be used to a limited extent.

Nevertheless, there is frequently the desire to provide distance sensors, especially for the automotive sector, which are also able to sense objects at shorter distances.

SUMMARY

The present invention permits the detection of echo signals during the post-pulse oscillation time. Objects at a small distance to the acoustic transducer are thereby detectable. An otherwise blind area in close proximity to the acoustic transducer is thus able to be covered. Therefore, within the framework of collision-warning systems, a particular area is able to be covered, so that, for example, maneuvering is made possible in close proximity. The danger of collision is thereby reduced. Furthermore, safety distances may be reduced without increasing the danger of collision. The invention is able to be implemented using customary means, in particular, already existing systems only having to be modified slightly to realize the invention.

Instead of ignoring a reflected transmit pulse during the post-pulse oscillation time, the present invention provides for analyzing a received signal of an acoustic transducer sooner within a post-pulse oscillation time of the transducer, in order to recognize a reflected transmit pulse in spite of a post-pulse oscillatory motion of the transducer. The received signal within the post-pulse oscillation time of the transducer is made up of a signal component which represents the post-pulse oscillation, and a signal component which represents the reflected transmit pulse. In this context, the signal component produced by the post-pulse oscillation dominates the signal component which was produced by the reflected transmit pulse in the transducer. To nevertheless receive a reflected transmit pulse which arrives during the post-pulse oscillation time of the transducer, the phase information of the received signal is considered. Since the post-pulse oscillation behavior is defined essentially by properties of the transducer, i.e., by a spring constant and an oscillatory mass, the post-pulse oscillation behavior may be taken as constant. This post-pulse oscillation behavior is reflected directly in a setpoint phase response. Therefore, the setpoint phase response may also be predefined. The setpoint phase response conveys phase information about the phase response of the received signal which the transducer outputs in the post-pulse oscillation time when it is neither electrically nor acoustically excited. The setpoint phase response likewise represents the resonant frequency of the transducer and therefore corresponds to the acoustic properties of the transducer which are defined by its type of construction.

According to the present invention, in order to receive a reflected transmit pulse within the post-pulse oscillation time of the transducer, an actual phase response of the received signal is compared to the setpoint phase response. The actual phase response of the received signal is made up of the actual post-pulse oscillatory motion of the transducer which is previously known, and the influence of the reflected transmit pulse which reaches the transducer during the post-pulse oscillation time. It was recognized that the consideration of the phase information, i.e., the actual phase response, makes it possible to separate the influence of the reflected transmit pulse during the post-pulse oscillation time from the post-pulse oscillatory motion itself, particularly since the setpoint phase response is defined essentially only by the type of construction of the transducer itself and thus is constant. Therefore, according to the invention, a deviation is ascertained between the actual phase response and the setpoint phase response, the deviation pointing directly to an object which reflects the transmit pulse to the transducer within the post-pulse oscillation time. The deviation represents the influence of the reflected transmit pulse and thus properties of the transmit pulse.

Therefore, the present invention relates to a method for acoustically sensing a spatial area, in which initially an acoustic transmit pulse is emitted by an acoustic transducer into the area. A received signal is acquired with the aid of the transducer in order to receive the transmit pulse reflected from the area. The received signal is preferably acquired electrically, that is, at the electrical connections of the transducer. The actual phase response of the received signal is determined within a post-pulse oscillation time of the transducer. In so doing, information is acquired which represents either the actual phase response itself over time or the features of the actual phase response. Therefore, the actual phase response may also be acquired on the basis of features which only characterize the actual phase response, but do not represent it identically. An object is detected within the area when the actual phase response deviates from a predefined setpoint phase response. To that end, the actual phase response is compared to the setpoint phase response. Such a comparison may relate to the phase responses themselves over time, or may relate to features which characterize the respective phase responses. The time span which directly follows the emission of the transmit pulse is regarded as post-pulse oscillation time. During the post-pulse oscillation time, the transducer itself is no longer excited electrically, however still continues to oscillate due to stored kinetic energy of the oscillatory mass and because of potential energy of elastic properties of the transducer.

The transmit pulse is generated by applying an electrical excitation signal to the transducer. Thus, the post-pulse oscillation time begins with the end of the excitation signal. The end of the post-pulse oscillation time is defined by an essentially completely damped natural oscillation of the transducer, that is, by an instant at which the transducer no longer carries out a natural oscillatory motion. Therefore, the post-pulse oscillation time ends when the natural oscillation of the transducer has ended essentially completely. The natural oscillation of the transducer has ended essentially completely when the amplitude of oscillation of the transducer is markedly less than an amplitude which results due to an acoustic pulse that comes from a dominant object in the sensed area. Furthermore, the post-pulse oscillation time may be predefined and depend directly on the type of construction of the transducer.

The setpoint phase response characterizes the oscillation of the electrically and acoustically unloaded transducer. Therefore, the setpoint phase response represents an oscillation of the transducer during which the transducer is neither electrically nor acoustically excited. The setpoint phase response is formed in accordance with a resonant frequency of the transducer. The resonant frequency in turn is obtained from the spring constant and the mass of the transducer. In particular, the setpoint phase response is a function only of the resonant frequency of the transducer and not the damping properties of the transducer, insofar as they have no effect on the spring constant or the oscillatory mass of the transducer. Therefore, the setpoint phase response corresponds to the resonant frequency of the transducer and vice versa.

Moreover, a deviation in phase between an actual signal characteristic and a setpoint signal characteristic may also be detected, the actual signal characteristic corresponding to the input signal and the setpoint signal characteristic corresponding to the signal amplitude of the transducer during the post-pulse oscillation time, while the transducer is neither acoustically nor electrically excited. The setpoint signal characteristic is predetermined and is defined only by the type of construction of the transducer. The deviation is determined on the basis of features which represent the respective phase of the actual signal characteristic and of the setpoint signal characteristic.

Thus, the deviation here also corresponds to the differences between the phase information of the actual signal characteristic and of the setpoint signal characteristic. In particular, these features, based on which the deviation is detected, represent the setpoint phase response and the actual phase response. Therefore, the sensing of the deviation of the differences between the phase information of the actual signal characteristic and the phase information of the setpoint signal characteristic corresponds to the detection, according to the present invention, of a deviation of the actual phase response from the setpoint phase response.

In particular, the deviation of the actual phase response from the setpoint phase response is determined with the aid of the following measures.

According to a first specific embodiment, the actual phase response is compared to the setpoint phase response. In so doing, the phase responses may be indicated continuously, quasi-continuously or in time-discrete fashion. In principle, the actual phase response and the setpoint phase response may also be indicated in value-discrete fashion. The actual phase response and the setpoint phase response, that is, the phase information which describes them, are preferably represented as relative angle information that is mapped onto the interval [−90°, 90°] or [0°, 180°]. Therefore, the relative angle information relates to the phase within one period of oscillation and is ambiguous for several periods of oscillation.

In a second specific embodiment, the time derivation of the actual phase response is compared to the time derivation of the setpoint phase response. In so doing, initially both the actual phase response and the setpoint phase response are differentiated as a function of time, especially by a differentiator, in order to obtain the time derivation. The time derivation of the respective phase responses corresponds to the characteristic of the instantaneous frequency of the received signal in the case of the actual phase response, and the resonant frequency in the case of the setpoint phase response.

A third specific embodiment provides that the actual phase response is represented by zero crossings or extremes, and the setpoint phase response is represented by zero crossings or extremes. In this context, the zero crossings or extremes which represent the actual phase response relate to zero crossings or extremes of the actual signal characteristic that corresponds to the received signal. The zero crossings or extremes which represent the setpoint phase response relate to zero crossings or extremes of the setpoint signal characteristic which is predefined. The number of zero crossings or extremes of the actual phase response which occur within a predefined time span is compared to the number of zero crossings or extremes of the setpoint phase response which occur within this time span. The difference between these numbers is detected. Thus, the actual phase response and the setpoint phase response are represented by the extremes and the zero crossings of the actual signal characteristic and of the setpoint signal characteristic. In particular, the extremes and the zero crossings are characterized by their respective occurrence instants; amplitude values of the extremes are particularly not taken into account. The deviation between the zero crossings or between the extremes of the actual signal characteristic and of the setpoint signal characteristic relates to the deviation between the respective occurrence instants which represent the actual phase response and the setpoint phase response.

Preferably, the number of zero crossings or extremes of the actual signal characteristic during one time span is compared to the number of zero crossings or extremes of the setpoint signal characteristic during this time span. Thus, the time spans used correspond to identical observation time spans of the actual signal characteristic and of the setpoint signal characteristic. The number of zero crossings may be ascertained by a zero-crossing detector or by differentiating the respective signal characteristic as a function of time and determining extremes of the differentiated signal characteristic. The number of extremes of the actual signal characteristic and the number of extremes of the setpoint signal characteristic may be ascertained by determining peak values, the extremes being either minima or maxima. In particular, the extremes may be determined by differentiating the actual signal characteristic and the setpoint signal characteristic as a function of time, as well as by detecting a zero crossing of the respective differentiated signal characteristic. The number of zero crossings or extremes of the actual signal characteristic and of the setpoint signal characteristic, respectively, is determined by a counter which may be set to zero at the beginning of the time span, for example, and whose count value at the end of the time span indicates the specific number. With the end of the time span, the counter may be reset. The number of zero crossings or the extremes of the respective signal characteristic corresponds to the instantaneous frequency of the respective signal characteristic. At the same time, this number corresponds to the instantaneous frequency of the respective phase response. In this context, rounding errors, which result due to a whole-number way of counting used in determining the respective number, are taken into account, if necessary. The number of zero crossings or extremes corresponds to the number of periods of oscillation of the received signal or the resonant frequency within the time span. The number of zero crossings or extremes of the setpoint signal characteristic is predefined by the resonant frequency and may therefore be a constant, predefined number, particularly an integer number.

According to a fourth specific embodiment, the occurrence instants of zero crossings or extremes of the actual signal characteristic are compared to the occurrence instants of zero crossings or extremes of the setpoint signal characteristic. In this case, the occurrence instants of the zero crossings or of the extremes of the actual signal characteristic represent the actual phase response. Furthermore, the occurrence instants of the zero crossings or of the extremes of the setpoint signal characteristic represent the setpoint phase response. In particular, the occurrence instants may be predefined as a value-discrete number, especially when a clock signal is used for the time acquisition. The occurrence instants are compared by determining whether the occurrence instants which represent the actual phase response lie before in time or after the occurrence instants which represent the setpoint phase response. The occurrence instants of the setpoint phase response represent the resonant frequency and are distributed periodically. The interval between the occurrence instants within the setpoint phase response corresponds to the period length of the resonant frequency of the transducer, which is a function only of the type of construction of the transducer. The occurrence instants within the setpoint phase response may be represented on the basis of predefined instants which are equidistant to each other in time, or on the basis of a fixed time interval between the occurrence instants. The occurrence instants are preferably represented in time-discrete fashion, so that a clock signal may be used as time base.

In the third and fourth specific embodiments, zero crossings or extremes of the actual signal characteristic and of the setpoint signal characteristic are used to represent the actual phase response and the setpoint phase response, respectively. The assertions made for the actual signal characteristic and the setpoint signal characteristic hold true equally for the actual phase response and the setpoint phase response.

The presence of an object is detected using the method according to the invention. In this context, the distance between the transducer and the object is also given by a predefined duration of the post-pulse oscillation time. Therefore, if an object is detected within the post-pulse oscillation time, then it may be indicated simultaneously that this object is present within a maximum distance that corresponds to the propagation time of the signal over the duration of the post-pulse oscillation time. The propagation time extends over a reflection time period that extends from the emission of a transmit pulse up to the reception of the reflected pulse.

Preferably, the distance between the transducer and the detected object is indicated more precisely, in doing which, one time span being utilized. The reflection time period, which extends from the emission of the transmit pulse up to the occurrence of the deviation, is used to ascertain the distance between the transducer and the detected object. The sonic speed is utilized to ascertain the distance between the transducer and the detected object, the distance being obtained directly from the reflection time period and the sonic speed. In so doing, the customary calculating methods as known from the field of pulse-echo methods are used for the distance measuring. In principle, a plurality of deviations may also be determined within the post-pulse oscillation time, each deviation corresponding to one object and the associated distance from the transducer. The ascertainment of the distance between the transducer and the detected object according to the present invention is comparable to customary pulse-echo methods, the occurrence instant of the deviation in the method according to the invention taking the place of the occurrence instant of a received pulse in the case of customary pulse-echo methods.

Moreover, it is provided that an object moving relative to the transducer is detected when the deviation between the actual phase response and the setpoint phase response exhibits a change over time. Since the deviation relates to a deviation of the actual phase response from the setpoint phase response, the change in this deviation over time represents a change in the signal reflected by the object to the transducer. From the change over time in the signal reflected by the object, it may be inferred that the position of the object is changing relative to the transducer. This corresponds to a movement of the object relative to the transducer. A relative velocity between the object and the transducer is determined on the basis of the change in the deviation between the actual phase response and the setpoint phase response over time. The relative velocity is yielded from the change in the deviation over time on the basis of a predefined dependency between the relative velocity and the change in deviation over time resulting from it. This dependency is predefined and rises monotonically. The dependency links the relative velocity present between the object and the transducer, and the change in the deviation between the actual phase response and the setpoint phase response over time resulting from it. Therefore, the predefined, monotonically rising dependency represents the Doppler effect, according to which the relative velocity between the object and the transducer leads to changes of the phase response in the received signal. In this context, the received signal represents the transmit pulse which was reflected by the moving object. The dependency may be indicated in the form of a formula or an approximation formula, and may further be provided in the form of a look-up table, preferably in combination with an interpolation device. In particular, this aspect of the invention may be linked to a specific embodiment of the invention in which the deviation between the actual phase response and the setpoint phase response is determined on the basis of the instantaneous frequencies or on the basis of information equivalent thereto.

Furthermore, the method of the present invention may be used to differentiate moving directions of the object relative to the transducer. In so doing, it is assumed that the object is moving relative to the transducer, which means the actual phase response is slower or faster than the setpoint phase response. Similarly, the actual signal characteristic is slower or faster than the setpoint signal characteristic. A moving direction with which the object is moving away from the transducer is detected when the deviation conveys that the actual phase response is slower than the setpoint phase response. This corresponds to a Doppler shift to smaller frequencies, which is expressed in an actual phase response that is slower than the setpoint phase response. The movement complementary to that may also be determined. A moving direction with which the object is moving toward the transducer is detected when the deviation conveys that the actual phase response is faster than the setpoint phase response. Instead of considering the speed of the actual phase response relative to the setpoint phase response, frequency information which represents the speed of the phase response may also be compared. As described above, such frequency information is yielded from the time derivation of the respective phase response, from the number of zero crossings within the respective phase response or by other variables that represent the instantaneous frequency within the respective phase response. The consideration of a rate of change of the actual phase response and of the setpoint phase response used here corresponds to the consideration of a rate of change of the actual signal characteristic and of the setpoint signal characteristic, since both rates of change convey the same phase information. Therefore, assertions made in the aforementioned specific embodiment for the actual phase response and the setpoint phase response hold true for the actual signal characteristic and the setpoint signal characteristic, as well.

An actual phase response which is slower than the setpoint phase response has longer time intervals between the zero crossings or the extremes and therefore represents a lower instantaneous frequency of the received signal compared to the resonant frequency. An actual phase response which is faster than the setpoint phase response has shorter time intervals between the zero crossings or the extremes and therefore represents a greater instantaneous frequency of the received signal compared to the resonant frequency. This holds true for the actual signal characteristic and setpoint signal characteristic, as well, since they convey the same phase information as the actual phase response and setpoint phase response.

A further aspect of the invention relates to a specific practical application of the method according to the invention. In this case, the transducer is secured in a cladding of a motor vehicle. The spatial area which is acoustically sensed lies in the area surrounding the vehicle. The area begins essentially directly at the transducer. Upon detecting the deviation between the actual phase response and the setpoint phase response, a warning signal is output which represents an object in close proximity to the transducer. In the present invention, the detection of the object according to the invention is used therefore to avoid collision of a motor vehicle. Since the area sensed according to the invention begins directly at the transducer and thus at the motor vehicle, it is possible that the motor vehicle may be maneuvered very close to objects. In this practical application, the method is used in a collision-warning system, especially within a parking-assistance system. In the present invention, the detection of an object according to the invention represents an object located at a distance of no more than 40 cm, 30 cm, 20 cm or 10 cm from the transducer. Objects are detected which are positioned so close to the transducer that the transmit pulse reflected by them arrives at the transducer during the post-pulse oscillation time.

Furthermore, the present invention relates to a device for acoustically sensing an area. It includes an input/output interface for the connection of an acoustic transducer, especially an acoustic transducer as described above. The device includes a transmit-pulse generator and a receiver. The transmit-pulse generator and the receiver are each connected to the input/output interface. The transmit-pulse generator emits a transmit signal via the input/output interface to the transducer, which converts it into an acoustic transmit pulse. The receiver receives the received signal of the transducer via the input/output interface. The receiver includes a comparator which is set up to compare an actual phase response, which is present at the input/output interface during a post-pulse oscillation time of the transducer, to a predefined setpoint phase response. The actual phase response corresponds to the phase response of the received signal which is emitted by the transducer to the input/output interface. The actual phase response used by the comparator is thus the actual phase response of the received signal. The receiver is set up to output an object signal, which denotes an object located within the area, in the event the actual phase response deviates from the setpoint phase response.

The receiver preferably includes a differentiator, a zero-crossing detector, a maxima-acquisition circuit, a minima-acquisition circuit or a phase-locked loop. This component is connected between the input/output interface and the comparator. The differentiator is used to ascertain the instantaneous frequency starting from the actual phase response. In like manner, the zero-crossing detector as well as the maxima-acquisition circuit or minima-acquisition circuit are used to determine the rate of change within the actual phase response, to thus convey a variable which characterizes the instantaneous frequency of the received signal. To that end, the zero-crossing detector and the maxima-acquisition circuit or minima-acquisition circuit are set up to ascertain occurrence instants of zero crossings, of maxima or of minima, based on which the rate of change is determined.

In particular, a phase-locked loop may be used, with which the phase of the received signal may be tracked, the phase-locked loop being set up to represent the instantaneous frequency. The phase-locked loop is designed to emit a control variable which represents the rate of change of the phase, i.e., the instantaneous frequency, especially in the form of a driving signal of a voltage-controlled or current-controlled oscillator, which is part of the phase-locked loop.

The device further includes a memory in which the setpoint phase response is stored. It is stored in the form of a resonant frequency of the transducer, in the form of a period length of the resonant frequency of the transducer or perhaps in the form of time markings which represent the instants of the zero crossings or of the extremes of the setpoint phase response.

In particular, the zero crossings or the extremes may be used to characterize the actual phase response. Instead of these features of the phase response, other features of the phase response may also be used, for example, turning points of the signal characteristic or other curve features. In this case, the device according to the present invention includes an acquisition circuit set up to ascertain the occurrence instants of such curve features.

The method is used to detect objects whose reflected transmit pulse arrives within a post-pulse oscillation time. Therefore, it may be provided that the method not be carried out when the post-pulse oscillation time has ended, for example, when the received signal has a signal strength which is less than a predefined threshold value. In particular, the method is first carried out when the excitation of the transducer has ended. It may be provided that the method first be carried out with the end of an additional safety time span that follows immediately at the end of the excitation of the transducer. In this case, the safety span is markedly shorter than the post-pulse oscillation time and corresponds, for example, to the length of a few periods of the resonant frequency, e.g., not more than two or not more than five periods of oscillation of the resonant frequency.

Instead of considering zero crossings in both directions, it is also possible to consider only the zero crossings in a specific direction, e.g., from a negative half wave to a positive half wave, so as to somewhat simplify the signal processing, for instance. Similarly, both extremes may be considered or, alternatively, only the minima or only the maxima.

BRIEF DESCRIPTION OF THE DRAWINGS

FIG. 1 shows an oscillation signal to better explain the present invention.

FIG. 2 shows a specific embodiment of the device according to the present invention for the acoustical sensing of an area.

DETAILED DESCRIPTION

FIG. 1 shows an actual signal characteristic of a transducer, which is used according to the invention. The transducer is excited up to an instant 10, so that an increasing amplitude of oscillation results up to instant 10. Post-pulse oscillation time 12 begins as of instant 10, instant 10 representing the end of the excitation of the transducer. It is apparent that in post-pulse oscillation time 12, the signal strength decreases continuously according to the post-pulse oscillation behavior of the transducer. During time span 14, a reflected transmit pulse strikes the transducer, so that the reflected transmit pulse influences the post-pulse oscillation behavior. After time span 14 within post-pulse oscillation time 12, the reflected transmit pulse has ended, and the post-pulse oscillation behavior is no longer influenced. An actual phase response results from zero crossings of the actual signal characteristic in the positive direction, the corresponding occurrence instants being represented as triangles. Similarly, a setpoint signal characteristic is drawn in, which is identified with crosses that represent the zero crossings of the setpoint signal characteristic in the positive direction. A setpoint phase response results from the zero crossings of the setpoint signal characteristic. The setpoint phase response is illustrated according to the constant resonant frequency of the transducer. Therefore, the crosses which represent the setpoint phase response are equidistant to each other. Up to instant 10, the occurrence instants of the zero crossings of the actual phase response correspond to the occurrence instants of the zero crossings of the setpoint phase response, especially since up to instant 10, the transducer is excited with the resonant frequency. In the post-pulse oscillation time up to time span 14, the transducer oscillates post-pulse with the resonant frequency of the transducer, so that the actual phase response corresponds to the setpoint phase response. This is illustrated in the figure by the fact that between instant 10 and the beginning of time span 14, the occurrence instants of the zero crossings of the actual phase response, which are depicted as triangles, correspond to the occurrence instants of the zero crossings of the setpoint phase response, which are depicted as crosses.

Within time span 14, during which the reflected transmit pulse and the post-pulse oscillation behavior are superposed, a compressed oscillatory motion results. This is immediately apparent through the triangles within time span 14, which lie markedly closer to each other than the triangles outside of time span 14. Since the zero crossings which represent the actual phase response follow each other more closely within time span 14, a deviation results with respect to the zero crossings which represent the setpoint phase response in the form of crosses. It is obvious that within time span 14, the zero crossings which represent the actual phase response deviate increasingly from the zero crossings which represent the setpoint phase response. This deviation is determined as deviation of the actual phase response from the predefined setpoint phase response, and an object is detected for time span 14.

After time span 14, the post-pulse oscillation is continued without the influence of a reflected transmit pulse, since it has ended, so that the deviation of the actual phase response from the predefined setpoint phase response remains constant. In comparison, the deviation of the actual phase response from the setpoint phase response changes within time span 14. The beginning of time spent 14 corresponds to the beginning of this deviation, so that for this instant, a reflected transmit pulse is assumed which is received by the transducer. An object may be inferred directly from this. The change in the deviation within time span 14 also makes it possible to infer that the object is moving toward the transducer, since the actual phase response is faster there than the setpoint phase response, as apparent from the sequence of the triangles relative to the sequence of the crosses. After time span 14, the deviation between the actual phase response and the setpoint phase response is constant, so that although the object may be inferred from this deviation, a movement of the object cannot be inferred. The deviation between the phase responses after time span 14 gives an indication that within time span 14, within which the deviation first occurred, a reflected transmit pulse was received. The deviation thereby resulting is merely continued as of time span 14. Therefore, the deviation within the time span which begins with the end of time span 14 only indicates an object, its distance being obtained from the instant at which the deviation first occurred. Therefore, the time interval between instant 10 and the beginning of time span 14 represents the distance between the object and the transducer. In other words, the distance of the object from the transducer is obtained through the time duration between the end of the excitation of the transducer and the beginning of the deviation between the actual phase response and the setpoint phase response in time span 14.

In FIG. 1, the resonant frequency of the transducer corresponds to 44 kHz, so that the time duration between two successive positive zero crossings, which are represented by the setpoint phase response, is approximately 22.7 µs.

FIG. 2 shows a specific embodiment of device 100 according to the present invention, having an input/output interface 110 to which an acoustic transducer 120 may be connected. Since acoustic transducer 120 is not necessarily part of the device, the connection to input/output interface 110 is illustrated only by a dotted line. The device includes a transmit-pulse generator 130 and a receiver 140. Receiver 140 includes a comparator 142 which is connected to input/output interface 110 via a zero-crossing detector 144 of receiver 140. Zero-crossing detector 144 is set up to receive the received signal of transducer 120 via input/output interface 110, and to detect the zero crossings of the received signal. The zero crossings detected by zero-crossing detector 144 represent the actual phase response of the received signal. Comparator 142 is set up to compare the actual phase response, which is characterized by the occurrence instants of the zero crossings of the received signal, to a corresponding setpoint phase response. The setpoint phase response is stored in a memory 146 of the receiver. In so doing, the setpoint phase response is stored in memory 146 in the form of occurrence instants of zero crossings which appear in a post-pulse-oscillation signal of an acoustically and electrically unloaded transducer. Since the zero crossings are identified only by their occurrence instants and the setpoint phase response may emanate from periodic zero crossings, only the time span between two successive zero crossings which characterize the setpoint phase response may be stored in memory 146. The comparison signal is emitted via an output 150 of the device, the output being connected to the output of comparator 142. Comparator 142 is designed to output a first signal when the actual phase response corresponds to the setpoint phase response, and to output a second different signal when a deviation exists between the actual phase response and the setpoint phase response. Furthermore, comparator 142 may be designed to output a change in the deviation over time in the form of a corresponding signal characteristic at output 150.

What is claimed is:

1. A method for acoustically sensing an area, comprising:
   emitting an acoustic transmit pulse into the area by an acoustic transducer;
   acquiring a received signal via the transducer in order to receive a transmit pulse reflected back from the area;
   within a post-pulse oscillation time of the transducer that directly follows the emitting of the transmit pulse, determining an actual phase response of the received signal; and detecting an object within the area if the actual phase response deviates from a predefined setpoint phase response.

2. The method as recited in claim 1, wherein:
the emitting includes generating the transmit pulse by applying an electrical excitation signal to the transducer,
the post-pulse oscillation time begins with an end of the excitation signal, and
the post-pulse oscillation time ends when a natural oscillation of the transducer ends essentially completely.

3. The method as recited in claim 1, wherein:
the setpoint phase response represents an oscillation of the transducer, during which the transducer is neither electrically nor acoustically excited, and
the setpoint phase response is formed in accordance with a resonant frequency of the transducer.

4. The method as recited in claim 1, further comprising:
determining a deviation of the actual phase response from the setpoint phase response by comparing the actual phase response to the setpoint phase response, by comparing a time derivation of the actual phase response to a time derivation of the setpoint phase response, by comparing a number of zero crossings or extremes occurring within a predefined time span and representing the actual phase response, to a number of zero crossings or extremes within the time span which represent the setpoint phase response, by comparing instants of zero crossings or extremes which represent the actual phase response to instants of zero crossings or extremes which represent the setpoint phase response.

5. The method as recited in claim 4, further comprising:
from a reflection time period that extends from the emitting of the transmit pulse up to the occurrence of the deviation, ascertaining a distance between the transducer and the detected object on the basis of a sonic speed.

6. The method as recited in claim 1, further comprising:
detecting an object moving relative to the transducer when a deviation of the actual phase response from the setpoint phase response exhibits a change over time; and
detecting a relative velocity between the object relative to the transducer and the transducer, the relative velocity resulting from a change in the deviation over time owing to a predefined dependency, the dependency being a monotonically rising dependency between the relative velocity and the change in deviation over time resulting therefrom.

7. The method as recited in claim 4, wherein the object moves relative to the transducer, the method further comprising:
detecting a moving direction with which the object is moving away from the transducer when the deviation conveys that the actual phase response is slower than the setpoint phase response; and
detecting a moving direction with which the object is moving toward the transducer when the deviation conveys that the actual phase response is faster than the setpoint phase response.

8. The method as recited in claim 4, wherein:
the transducer is secured in a cladding of a motor vehicle,
the area which is acoustically sensed lies in an area surrounding the vehicle,
and
upon detection of the deviation between the actual phase response and the setpoint phase response, a warning signal is output which represents an object in close proximity to the transducer.

9. The method as recited in claim 8, wherein the object has a distance of no more than one of 40 cm, 30 cm, 20 cm and 10 cm from the transducer.

10. A device for acoustically sensing an area, comprising:
an input/output interface for connecting an acoustic transducer;
a transmit-pulse generator; and
a receiver, each of the transmit-pulse generator and the receiver being connected to the input/output interface, wherein the receiver includes a comparator that compares an actual phase response, which is present at the input/output interface during a post-pulse oscillation time of the transducer, to a predefined setpoint phase response, wherein the receiver outputs an object signal that denotes an object located within the area in the event the actual phase response deviates from the setpoint phase response.

11. The device as recited in claim 10, wherein:
the receiver includes:
a differentiator,
a zero-crossing detector,
a maxima-acquisition circuit, and
one of a minima-acquisition circuit and a phase-locked loop connected between the input/output interface and the comparator, and
the setpoint phase response is stored in a memory of the device one of in the form of a resonant frequency of the transducer, in the form of a period length of the resonant frequency of the transducer, and in the form of an occurrence pattern of zero crossings, of maxima or of minima which corresponds to an oscillation of the transducer during which the transducer is neither electrically nor acoustically excited.

\* \* \* \* \*